United States Patent [19]

Fite, Jr.

[11] Patent Number: 4,993,015

[45] Date of Patent: Feb. 12, 1991

[54] AUTOMATIC FAULT RECOVERY IN A PACKET NETWORK

[75] Inventor: Franklin D. Fite, Jr., Aberdeen, N.J.

[73] Assignee: AT&T Bell Laboratories, Murray Hill, N.J.

[21] Appl. No.: 431,797

[22] Filed: Nov. 6, 1989

[51] Int. Cl.⁵ .............................................. H04J 3/14
[52] U.S. Cl. ....................................... 370/16; 371/8.2
[58] Field of Search ................... 370/14, 16, 60, 94.1; 371/8.2, 11.2

[56] References Cited

U.S. PATENT DOCUMENTS

| | | | |
|---|---|---|---|
| 4,550,397 | 10/1985 | Turner et al. | 370/60 |
| 4,593,154 | 6/1986 | Takeda et al. | 370/16 |
| 4,679,189 | 7/1987 | Olson et al. | 370/60 |
| 4,703,477 | 10/1987 | Adelmann et al. | 370/94 |
| 4,777,595 | 10/1988 | Strecker et al. | 370/94.1 |
| 4,920,929 | 4/1990 | Sasaki et al. | 370/16 |

OTHER PUBLICATIONS

J. A. McDermid, "Design and Use of Comflex-A Hardware-Controlled Packet Switch", IEE Proceedings, vol. 127, Pt. E., No. 6, pp. 233-240, Nov. 1980.

I. Cidon et al., "Paris: An Approach to Integrated High-Speed Private Networks", International Journal of Digital and Analog Cabled Systems, vol. 1, No. 2, pp. 77-85, Apr.-Jun. 1988.

CCITT Recommendation Q.921, pp. 41-48.

Committee T1 Contribution, "Explicit Congestion Avoidance Indication as Part of Link Layer Management", T1S1.1-89/339, T1S1.2-89/240, Jul. 17-19, 1989, pp. 1-14.

W. S. Lai, "Frame Relaying Service: An Overview", Proceedings IEEE INFOCOM 89, Apr. 23-27, 1989, pp. 668-673.

R. J. Cherukuri et al., "Frame Relay: Protocols and Private Network Applications", Proceedings IEEE INFOCOM 89, Apr. 23-27, 1989, pp. 676-685.

Primary Examiner—Douglas W. Olms
Assistant Examiner—Melvin Marcelo
Attorney, Agent, or Firm—Thomas Stafford

[57] ABSTRACT

An arrangement is disclosed for recovering from faults in transmission equipment or facilities forming so-called virtual circuits for transmitting packets in a network. Faults are detected in transmission paths associated with a network node and a fault indication message is generated for each virtual circuit passing through the node that is affected by the fault. The fault indication messages are then transmitted on corresponding ones of the affected virtual circuits. If any of the affected virtual circuits are termianted in the node, they are switched to alternate virtual circuits. Otherwise, the fault indication messages are transmitted on corresponding virtual circuits over facilities connected to the node to other unknown nodes. A node receiving a fault indication message determines whether the corresponding virtual circuit is terminated at the node or passes through it to some other unknown node. If an affected virtual circuit is terminated in the node, it is switched to an alternate virtual circuit. If the affected virtual circuit is not terminated in the node, the corresponding fault indication message is passed through it on that virtual circuit over a facility to some other unknown node.

26 Claims, 9 Drawing Sheets

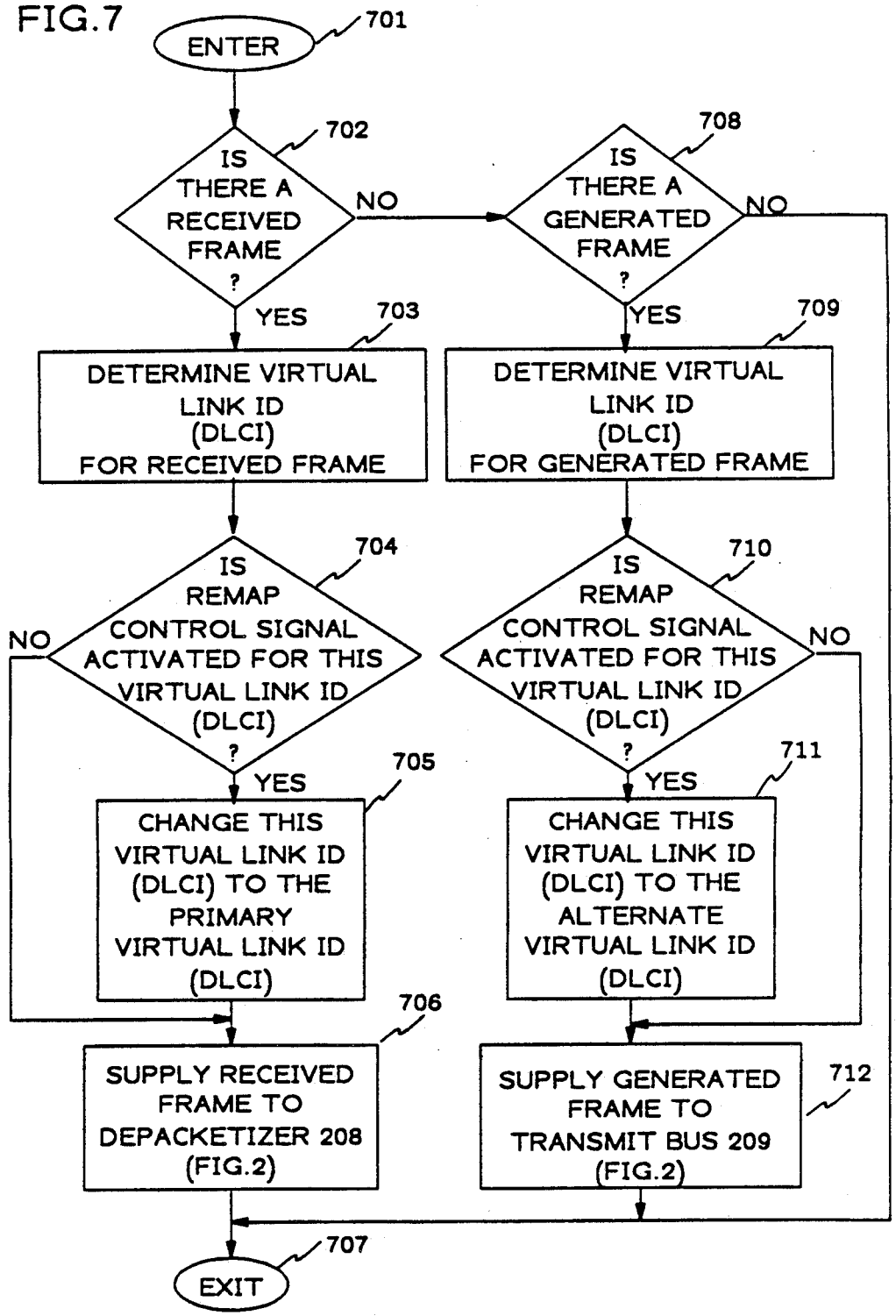

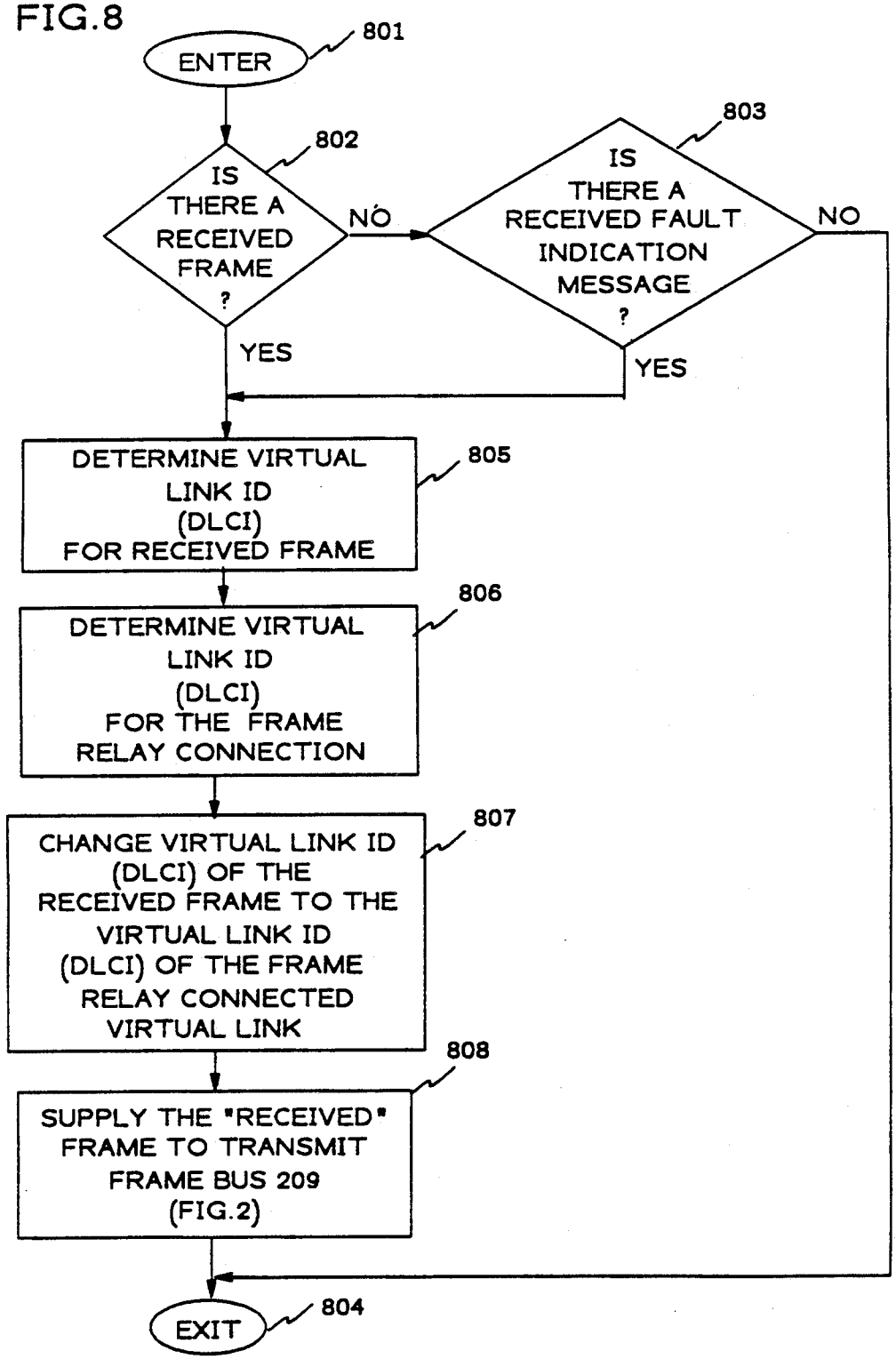

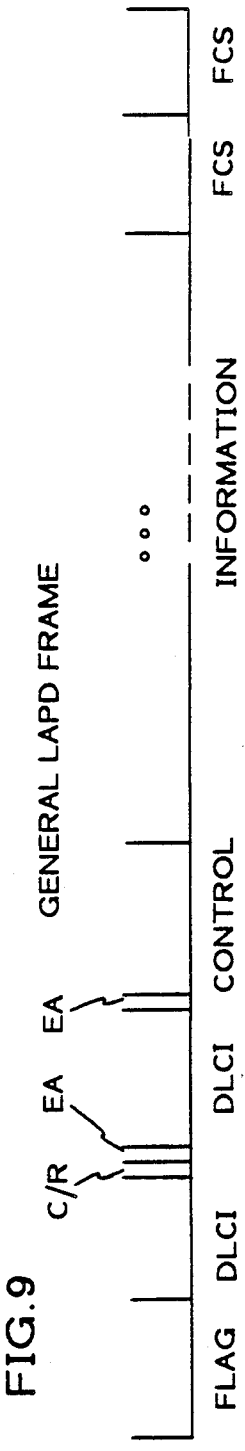
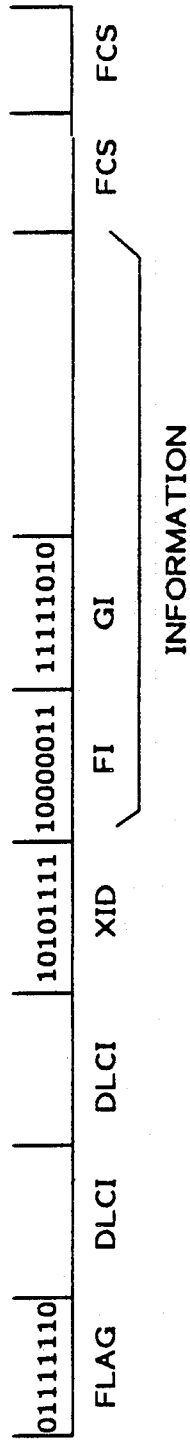
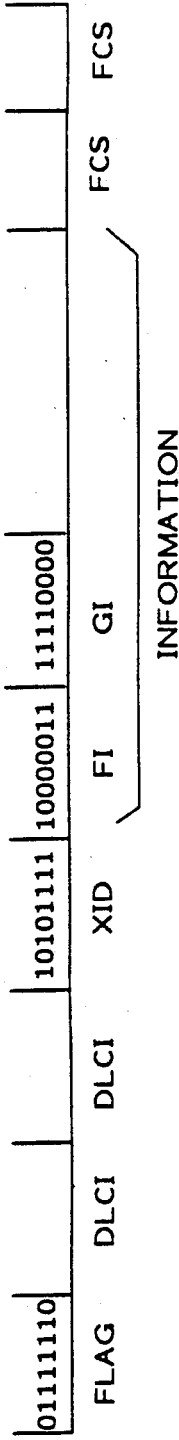
FIG. 9  GENERAL LAPD FRAME
FIG. 10  FAULT INDICATION MESSAGE
FIG. 11  FAULT INDICATION MESSAGE

4,993,015

AUTOMATIC FAULT RECOVERY IN A PACKET NETWORK

CROSS-REFERENCE TO RELATED APPLICATIONS

U.S. patent application Ser. No. 07/431,796 and Ser. No. 07/431,795 were filed concurrently herewith.

TECHNICAL FIELD

This invention relates to packet transmission systems and/or networks and, more particularly, to automatic recovery from faults in the system and/or network.

BACKGROUND OF THE INVENTION

Prior packet transmission and switching systems and/or networks included fault recovery arrangements. One such prior arrangement required a so-called centralized network management function to analyze reported faults and to reconfigure the network as required. Consequently, the centralized network management function required knowledge of the entire network and connectivity to each node in the network. Such arrangements are slow to respond to faults and are also susceptible to faults in the network and in the management function itself.

In another prior fault recovery arrangement, each node in the network required knowledge of the network configuration and knowledge of faults occurring in the network. In such an arrangement, each node must store additional network configuration data other than that needed for transmission of packets in the particular node. Any change in the network configuration may require a change in the information being stored in the node. Both the storing and updating of the configuration information in the node is cumbersome and expensive to implement.

SUMMARY OF THE INVENTION

These and other problems and limitations of prior automatic packet fault recovery arrangements are overcome, in accordance with an aspect of the invention, by detecting faults in transmission paths associated with a network node and, then, generating a fault indication message for each virtual circuit passing (i.e., switched) through the node that is affected by the detected fault. The fault indication messages are then transmitted on corresponding ones of the affected virtual circuits. If any of the affected virtual circuits are terminated in the node, no fault indication messages are generated for those virtual circuits and they are switched to alternate virtual circuits.

A node receiving such a fault indication message determines whether the corresponding virtual circuit is terminated, i.e., exits the network, at the node or passes through this node to some other unknown node in the network. If an affected virtual circuit is terminated in the node, it is switched to an alternate virtual circuit. If an affected virtual circuit is not terminated in the node, the corresponding received fault indication message is passed through the node on that virtual circuit to the some other unknown node.

BRIEF DESCRIPTION OF THE DRAWINGS

In the drawings:

FIG. 7 is a flow chart illustrating a sequence of operations effected by the access circuit mapping unit of FIG. 2;

FIG. 8 is a flow chart showing a sequence of operations effected by the frame relay unit of FIG. 2;

FIG. 9 is a graphic representation of a LAPD frame; and

FIGS. 10 and 11 are graphic illustrations of fault indication messages employed in this embodiment of the invention.

DETAILED DESCRIPTION

Figure 1:
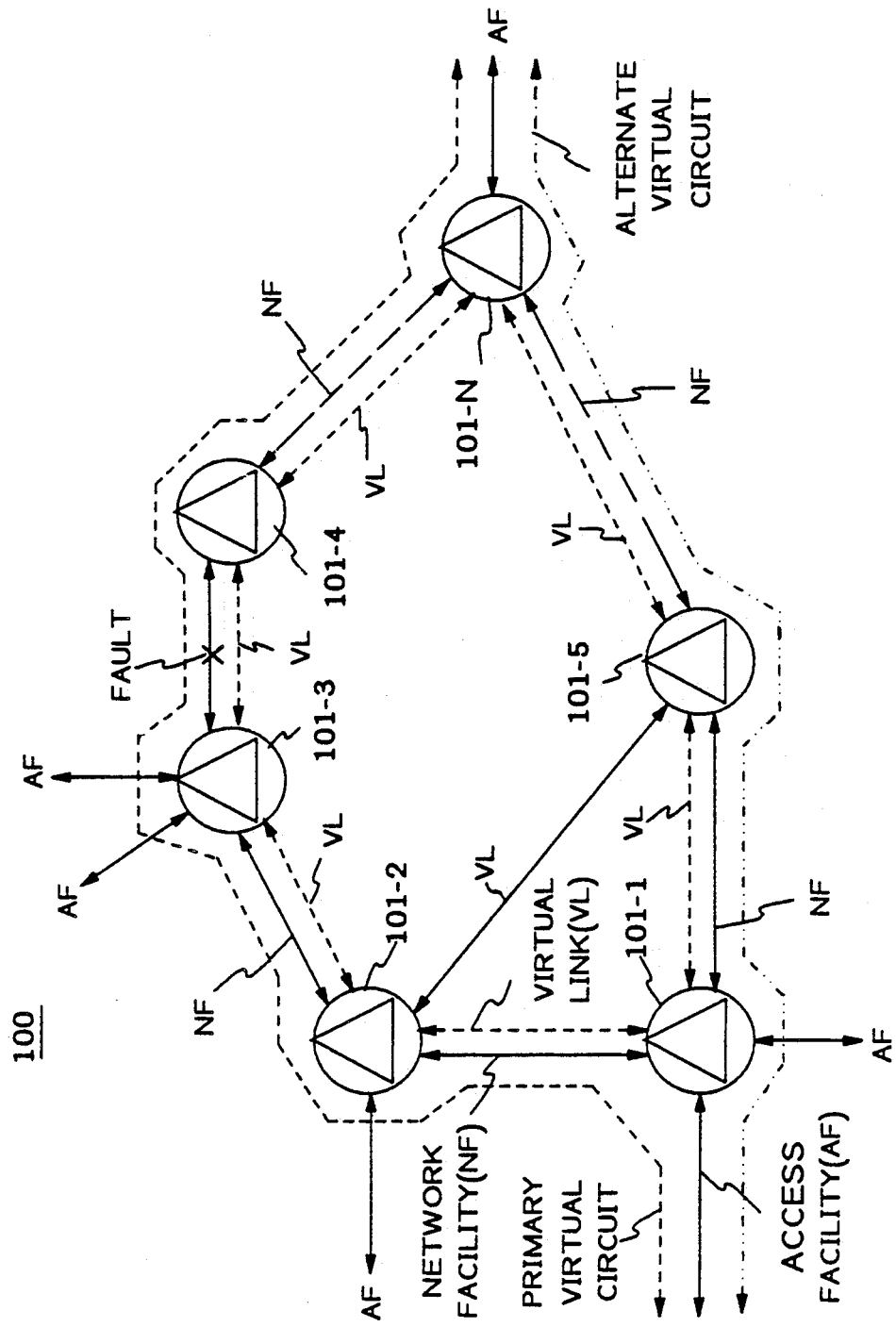
FIG. 1 shows, in simplified form, a packet transmission system and/or network including an embodiment of the invention.

FIG. 1 shows, in simplified form, details of transmission system and/or network 100 employing an embodiment of the invention. Accordingly, shown are a plurality of system and/or network nodes, namely, nodes 101-1 through 101-N. Hereinafter all references will be made to network nodes, etc. Also shown are a number of network facilities (NFs) connecting nodes 101 and access facilities (AFs) connected to particular ones of nodes 101. Network facilities carry virtual links (VLs) between nodes inside the network. Access facilities carry access circuits from the network to outside of the network and, conversely, from outside of the network to the network. In this example, some of nodes 101 are identical and others are not depending on their particular function in the network. That is, some of nodes 101 have access facilities connected to them while others do not. It will also be apparent that particular ones of nodes 101 may have a plurality of access facilities. Similarly, particular ones of nodes 101 may interface with a plurality of network facilities connecting them to one or more other nodes. In this specific example, it is assumed that the network facilities are either T1, CEPT1, or T3 transmission facilities using nonchannelized ISDN packet mode framing formats, e.g., LAPD, protocols, and procedures. In some different applications, other facilities may be employed, for example, local area networks, wide area networks, RS232 and the like. Each network facility carries one or more virtual links. The access facilities are assumed to be T1 or ISDN basic rate interface (BRI) facilities. Each access facility carries one or more access circuits. In a network node, an access circuit may be connected to a virtual link or a virtual link may be connected to another virtual link. A virtual circuit for a call comprises a local access circuit, one or more virtual links connected through one or more nodes and at least one remote access circuit. It will be apparent to those skilled in the art that other transmission facilities and other packet protocols may equally be employed in practicing the invention.

For the purposes of illustrating the fault recovery operation of network 100, in accordance with an aspect of the invention, it is assumed that a primary virtual circuit, shown in dashed outline, is provisioned between an access circuit carried on the access facility (AF) shown connected to node 101-1 and an access circuit carried on the access facility (AF) shown connected to node 101-N. The primary virtual circuit is carried from originating node 101-1 to destination node 101-N through a primary path including nodes 101-2, 101-3 and 101-4 and virtual links (VLs) carried on the associated network facilities (NFs). Additionally, an alternate virtual circuit, shown in dot-dashed outlined, is provisioned between the access circuit carried on the access facility (AF) connected to node 101-1 and the access circuit carried on the access facility (AF) connected to node 101-N on an alternate path passing through node 101-5 and virtual links carried on the associated network facilities (NFs). Although only one primary virtual circuit and one alternate virtual circuit are shown, there may be a plurality of such virtual circuits between node 101-1 and node 101-N. Moreover, it is important to note that none of nodes 101 in network 100 has knowledge of any other node in the network. Each of nodes 101, only knows its own mappings of access circuits to virtual links and virtual links to virtual links. It is further noted that a fault can occur in the node equipment itself or in one or more network facilities connecting nodes. In this example, it is assumed that a fault occurs somewhere in the transmission path between nodes 101-3 and 101-4.

When the fault occurs, the primary virtual circuit is disrupted along the primary path between node 101-1 and node 101-N. Upon detecting the fault, each of nodes 101-3 and 101-4 determines that a particular virtual circuit, among others, is affected by the fault. Node 101-3 generates a fault indication message and supplies it as an output on the affected virtual circuit to node 101-2. In this example, the fault indication message is a LAPD frame (FIGS. 10 and 11) using a XID format (See CCITT Recommendation Q.921, pages 42–48, and a Committee T1 Contribution, "Explicit Congestion avoidance indication as part of Link Layer management", T1S1.1-89/339, T1S1.2-89/240, July 17–19, 1989, pages 1–14 for an explanation of the LAPD frame and XID format). Similarly, node 101-4 generates a fault indication message and supplies it as an output on the affected virtual circuit to node 101-N. Again, it is noted that neither node 101-3 nor node 101-4 has knowledge of other nodes in the path or of the end points of the affected virtual circuit. Nodes 101-3 and 101-4 include information relating only to the virtual link to virtual link mapping of the virtual circuit. Upon receiving the fault indication message, node 101-2 determines whether the affected virtual circuit is terminated at this node. Since the fault indication message does not apply to a virtual circuit terminated in node 101-2, it relays the fault indication message on the virtual link of the affected virtual circuit passing through the network facility connecting node 101-2 to node 101-1. In this example, this relaying of the fault indication message is realized by employing the known LAPD frame relay procedures. (See articles entitled "Frame Relay: Protocols and Private Network Applications", *Proceedings IEEE INFOCOM* 89, Apr. 23–27, 1989, pages 676–685 and "Frame Relaying Service: An Overview", *Proceedings IEEE INFOCOM* 89, Apr. 23–27, 1989, pages 668–673 for an explanation of frame relay). When node 101-1 receives the fault indication message it determines that the fault indication message applies to a virtual circuit that is terminated at this node. Then, node 101-1 switches the virtual circuit from its primary path that was disrupted by the fault to its alternate path that passes through node 101-5. Similar actions to those effected in node 101-1 are taken by node 101-N upon receiving the fault indication message that was originated by node 101-4. Thus, it is seen that, in accordance with an aspect of the invention, the network has recovered from the fault on the affected virtual circuit. Furthermore, it can be seen that, in accordance with an aspect of the invention, this recovery is accomplished without any node having information relating to the network topology other than for the network facilities that terminate at individual ones of nodes 101.

Figure 2:
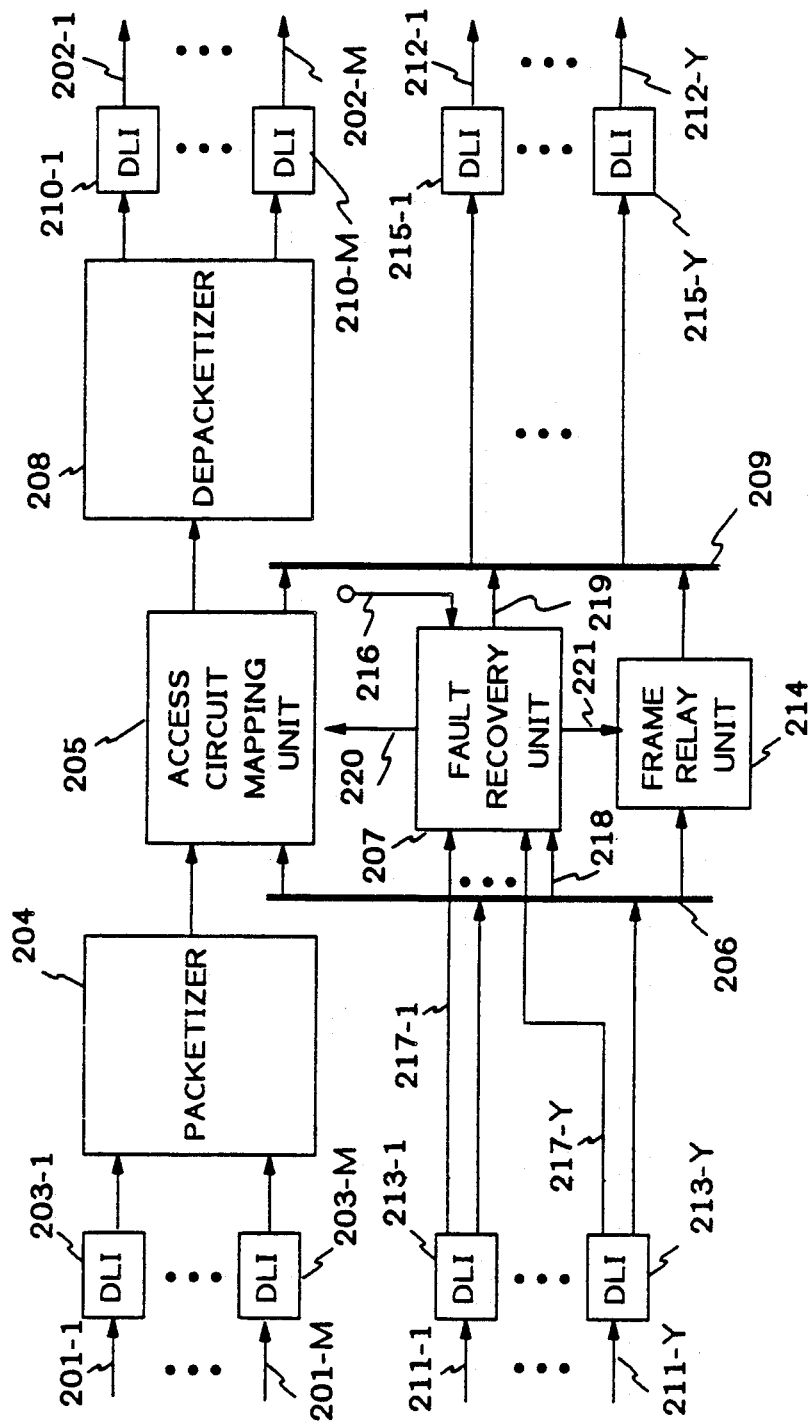
FIG. 2 depicts, in simplified block diagram form, details of a packet node used in the system and/or network of FIG. 1.

FIG. 2 shows, in simplified block diagram form, the general architecture of nodes 101. It is to be noted that the configuration of specific ones of nodes 101 may include an interface to at least one network facility and may not include any access facilities. However, a typical one of nodes 101 includes one or more receive access facilities 201-1 through 201-M, and a corresponding number of transmit access facilities 202-1 through 202-M. It is noted that pairs of receive access facilities 201-1 through 201-M and transmit access facilities 202-1 through 202-M, respectively, form the access facilities (AFs) shown in FIG. 1. As indicated above, the signals received and transmitted on the access links may take any desired form. In this example, it is assumed that the access facility signals are non-packetized T-carrier in the known DS1 format. Thus, in this example, an access facility carries up to 24 access circuits. Signals obtained from receive access facilities 201-1 through 201-M are supplied via digital line interface (DLI) units 203-1 through 203-M, respectively, to packetizer 204. Each of digital line interfaces 203 are of a type well known in the art for interfacing the DS1 signals being supplied via the receive access facilities 201. Packetizer 204 forms incoming voice or data information into a packet format. Such packetizers are known in the art. In this example, the LAPD format is used for packetization. The LAPD layer 2 data unit is known as a frame, and the layer 3 data unit is known as a packet. Thus, throughout this example, the term "frame" is used instead of "packet". The LAPD frames (FIG. 9) generated in packetizer 204 are supplied to access circuit mapping unit 205. Access circuit mapping unit 205 also obtains received frames from receive frame bus 206. Additionally, remap control signals are supplied to access circuit mapping unit 205 via circuit path 220 from fault recovery unit 207. The remap control signals control remapping of access circuits carried on receive access facilities 201 to virtual links carried on transmit network facilities 212, and the remapping of virtual links carried on receive network facilities 211 to the original access circuits carried on transmit access facilities 202. Access circuit mapping unit 205 yields so-called terminated frames which are supplied to depacketizer 208, and so-called transmit frames which are supplied to transmit frame bus 209. Operation of access circuit mapping unit 205 is described below in conjunction with FIG. 6. Depacketizer 208 reconstructs the voice or data digital signals from the terminated LAPD frames. These signals are supplied via digital line interface (DLI) units 210-1 through 210-M to transmit access facilities 202-1 through 202-M, respectively. Again, such digital line interface units and such depacketizers are known in the art.

Received LAPD frames from receive network facilities 211-1 through 211-Y are supplied to digital line interface (DLI) units 213-1 through 213-Y, respectively. Each of digital line interface units 213 is of a type well known in the art for interfacing DS1 digital signals. In this example, each of digital line interface (DLI) units 213 generates a facility failure signal in well known fashion. The facility failure signals from digital line interfaces 213-1 through 213-Y each indicate whether a red, yellow, blue, or performance alarm has occurred and are supplied via circuit paths 217-1 through 217-Y, respectively, to fault recovery unit 207. Each of digital line interface units (DLI) 213-1 through 213-Y supplies the received LAPD frames to receive frame bus 206. The received frames can be of many types, including received fault indication messages as shown in FIGS. 10 and 11. Fault recovery unit 207 obtains the received fault indication messages from receive frame bus 206 via circuit path 218, in well known fashion. An equipment failure signal indicating the failure of any unit in this node in the path of any virtual circuit is supplied via circuit path 216 to fault recovery unit 207. Fault recovery unit 207 generates transmit fault indication messages which are supplied via circuit path 219 to transmit frame bus 209 and receive fault indication messages which are supplied via circuit path 221 to frame relay unit 214. Frame relay unit 214 obtains the received frames from receive frame bus 206. Additionally, frame relay unit 214 relays transmit frames from receive frame bus 206 to transmit frame bus 209. To this end, frame relay unit 214 employs the known frame relay procedure to remap these incoming frames into transmit frames that are supplied to transmit frame bus 209. The relayed frames include appropriate address mapping for each virtual circuit. That is to say, LAPD frames that are passing through this node are frame relayed from receive frame bus 206 to transmit frame bus 209. The operation of frame relay unit 214 is described below in conjunction with FIG. 7. In turn, the appropriate transmit frames are obtained from transmit frame bus 209 by digital line interface units 215-1 through 215-Y and, then, supplied to transmit network facilities 212-1 through 212-Y, respectively. Pairs of receive network facilities 211-1 through 211-Y and transmit network facilities 212-1 through 212-Y form the network facilities (NFs) shown in FIG. 1.

Fault recovery unit 207 monitors for fault indication messages (FIGS. 10 and 11) on receive frame bus 206. This is achieved by monitoring received frames for those that match a prescribed format. To this end, control fields in the received frames are monitored to determine if the frames include a fault indication message. In this example, the prescribed format is the so-called LAPD XID frame format denoting fault indication messages for either a fault condition or a clear condition, as shown in FIG. 10 and FIG. 11, respectively. As shown in both FIG. 10 and FIG. 11 the affected virtual circuit ID (DLCI) is included in the DLCI fields, an indication (in this example, 10101111) that the LAPD frame is an XID frame is included in the XID field, an indication that this XID frame is a fault indication message, in accordance with an aspect of the invention, is included in the FI field and an indication, in accordance with an aspect of the invention, of whether the fault indication message denotes a fault or clear condition is included in the GI field. Thus, in this example, as shown in FIG. 10, the indication 11111010 in the GI field denotes a fault condition and, as shown in FIG. 11, the indication 11110000 in the GI field denotes a clear condition. It will be apparent to those skilled in the art that other signaling arrangements may equally be employed to indicate the presence of a fault indication message. Upon obtaining a fault indication message, fault recovery unit 207 either sends a remap control signal to access circuit mapping unit 205 causing it to switch a corresponding access circuit to a virtual link included in the alternate virtual circuit, in accordance with an aspect of the invention, or sends a corresponding receive fault indication message via circuit path 221 to frame relay unit 214. In turn, frame relay unit 214 supplies the fault indication message to another node on a virtual link included in the primary virtual circuit. Additionally, fault recovery unit 207 monitors for facility or equipment failures, and either orders access circuit mapping unit 205 via remap control signals to switch the affected access circuits to alternate virtual circuits and/or generates transmit fault indication messages to be passed via transmit frame bus 209 and appropriate ones digital line interface (DLI) units 215-1 through 215-Y and transmit network facilities 212-1 through 212-Y, respectively, to other ones of nodes 101 in network 100 (FIG. 1). Further details regarding operation of fault recovery unit 207 are discussed below in conjunction with FIGS. 3 through 6.

Figure 3:
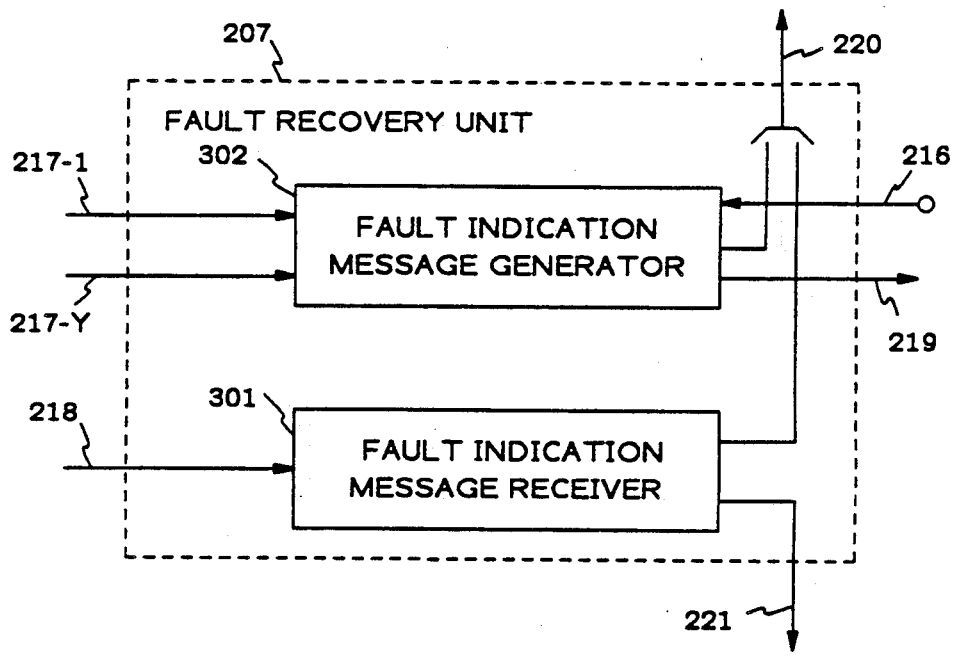
FIG. 3 shows, in simplified block diagram form, details of the fault recovery unit employed in the node of FIG. 2.

FIG. 3 depicts, in simplified block diagram form, details of fault recovery unit 207 of FIG. 2. Accordingly, shown are fault indication message receiver 301 and fault indication message generator 302. Fault indication message receiver 301 obtains received fault indication messages via circuit path 218 from receive frame bus 206. If the received fault indication message is for an access circuit in this node, the remap control signal for that access circuit is activated. If a received fault indication message is not for an access circuit in this node, it is supplied as an output unchanged to frame relay unit 214. The operation of fault indication message receiver 301 is shown in the flow chart of FIG. 4 and described below. Fault indication message generator 302 is responsive to either a facility failure signal or an equipment failure signal becoming active or inactive. When either failure signal becomes active, fault indication message generator 302 determines if the failure affects an access circuit terminated in this node. If an access circuit terminated in this node is affected, a remap control signal for the access circuit is activated. If the affected access circuit is not in this node, a transmit fault indication message including a fault indication (FIG. 10) is generated for the affected access circuit. Similarly, when the fault is cleared, either the remap control signal is deactivated or a transmit fault indication message including a clear indication (FIG. 11) is generated. Operation of fault indication message generator 302 is described below in conjunction with the flow chart shown in FIGS. 5 and 6.

Figure 4:
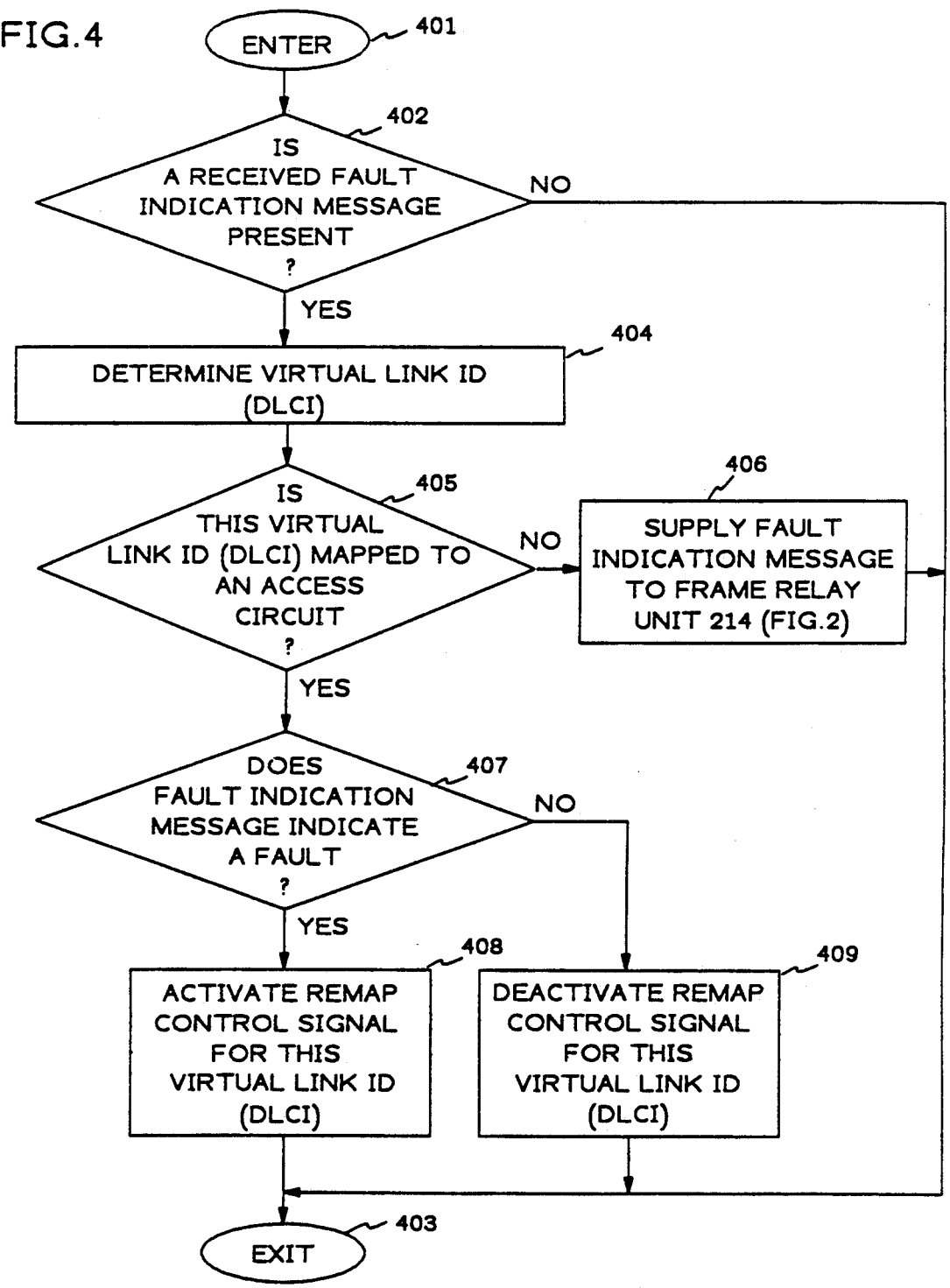
FIG. 4 is a flow chart of a sequence of operations effected by the fault indication message receiver of FIG. 3.

FIG. 4 is a flow chart showing a sequence of operations effected in fault indication message receiver 301 of FIG. 3. Accordingly, the sequence is entered via step 401. Thereafter, conditional branch point 402 tests to determine if there is a received fault indication message on receive frame bus 206 (FIG. 2). If the test result is NO, the sequence is exited via step 403. If the test result in step 402 is YES, operational block 404 determines the virtual link identification corresponding to the obtained fault indication message. In the LAPD format this identification (ID) is known as the DLCI. Then, conditional branch point 405 tests to determine if the determined virtual link ID (DLCI) is mapped to an access circuit in this node. If the test result in step 405 is NO, the virtual link denoted by this DLCI is frame relayed via frame relay unit 214 (FIG. 2) through this node. To this end, operational block 406 supplies as an output the received fault indication message to frame relay unit 214 (FIG. 2). Thereafter, the sequence is exited via step 403. If the test result in step 405 is YES, the virtual link denoted by this DLCI is mapped to an appropriate access circuit in this node, i.e., the virtual circuit is terminated at this node. Conditional branch point 407 tests to determine that the received fault indication message indicates the activating of a fault or the clearing of a fault. If the test result in step 407 is YES, indicating the activation of a fault, operational block 408 supplies as an output an activated remap control signal for this virtual link ID (DLCI) to access circuit mapping unit 205 (FIG. 2). Thereafter, the sequence is exited via step 403. If the test result in step 407 is NO, indicating clearing of a fault, operational block 409 supplies as an output a deactivated remap control signal for this virtual link ID (DLCI) to access circuit mapping unit 205 (FIG. 2). Thereafter, the sequence is exited via step 403. Alternatively, the operations of steps 402 and 404 through 406 could be reversed in order such that steps 404 and 405 are performed for all received frames and if the test result in step 405 is YES, then step 402 is performed to determine if the received frame includes a fault indication message.

Figure 5:
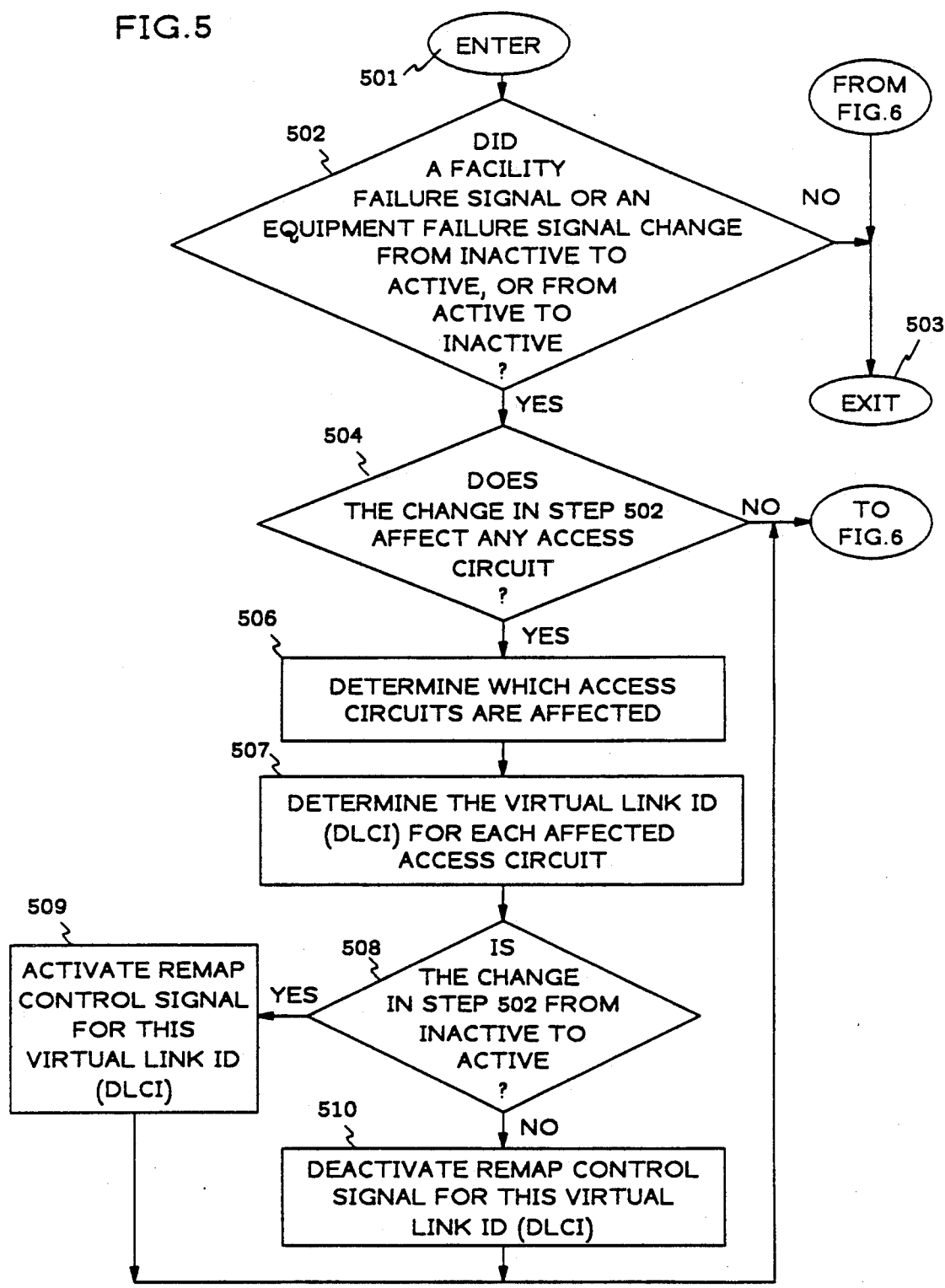
FIGS. 5 and 6 when connected as shown, form a flow chart illustrating a sequence of operations effected by the fault indication message generator of FIG. 3.
Figure 6:
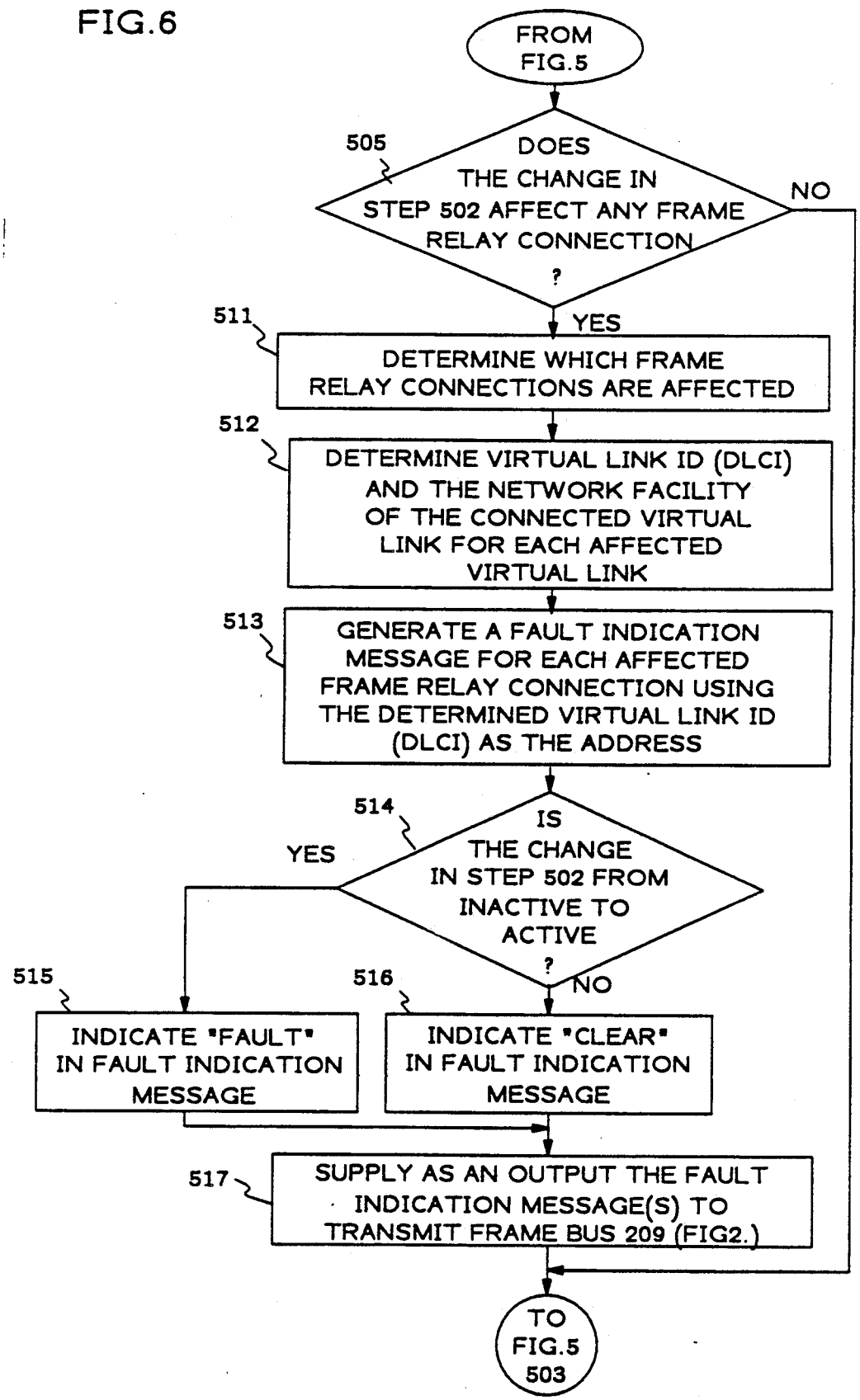

FIGS. 5 and 6, when connected as shown, form a flow chart of a sequence of operations effected by fault indication message generator 302 of FIG. 3. Accordingly, the sequence is entered via step 501. Thereafter, conditional branch point 502 tests changes in the state of either the facility failure signal or equipment failure signal. The active state indicates that a fault has occurred and the inactive state indicates that no fault is present. If there is no change in the state of these failure signals, the sequence is exited via step 503. If there is a change in the state of either of the failure signals, conditional branch point 504 tests to determine if the change of state in either of the failure signals affects any virtual link that is mapped to an access circuit at this node. If the test result in step 504 is NO, control is supplied to conditional branch point 505 (FIG. 6). If the test result in step 504 is YES, operational block 506 determines which access circuits are affected. It is noted that more than one access circuit may be affected. Then, operational block 507 determines the virtual link ID (DLCI) for each affected access circuit. Conditional branch point 508 tests to determine if the change in state of either failure signal is from inactive to active. If the test result in step 508 is YES, operational block 509 activates the remap control signal for this virtual link ID (DLCI). Then, control is supplied to conditional branch point 505. If the test result in step 508 is NO, operational block 510 deactivates the remap control signal for this virtual link ID (DLCI). Thereafter, control is supplied to conditional branch point 505 (FIG. 6). Conditional branch point 505 tests to determine if the change in state of either failure signal affects any so-called frame relay connection, i.e., virtual link to virtual link connection. It is noted that an affected frame relay connection includes a faulted or cleared virtual link and a connected virtual link. If the test result in step 505 is NO, the sequence is exited via step 503 (FIG. 5). If the test result in step 505 is YES, operational block 511 determines which frame relay connections are affected by the fault.

Operational block 512 determines the virtual link ID (DLCI) and the network facility of the connected virtual link for each affected virtual link. Operational block 513 generates a fault indication message for each affected frame relay connection using the virtual link ID (DLCI) that was determined in step 512 as an address. Conditional branch point 514 tests to determine whether the change in state of either failure signal is from inactive to active. If the test result in step 514 is YES, operational block 515 causes the fault indication message generated in block 513 to indicate "fault" (FIG. 10). If the test result in step 514 is NO, operational block 516 causes the fault indication message generated in block 513 to indicate "clear" (FIG. 11). Thereafter, operational block 517 supplies as an output the fault indication messages to transmit frame bus 209 (FIG. 2). Then, the sequence is exited via step 503 (FIG. 5).

FIG. 7 is a flow chart of a sequence of operations effected by access circuit mapping unit 205 of FIG. 2. Accordingly, the sequence is entered via step 701. Thereafter, conditional branch point 702 tests to determine if a received frame is present on receive frame bus 206 (FIG. 2). If the test result in step 702 is YES, operational block 703 determines the virtual link ID (DLCI) for the received frame. Conditional Branch point 704 tests to determine if the remap control signal is active for this virtual link ID (DLCI). If the test result in 704 is YES, operational block 705 causes the virtual link ID (DLCI) determined in step 703 to be modified to a DLCI for the appropriate virtual link ID of the primary virtual circuit. If the test result in step 704 is NO, no action is taken to change the virtual link ID (DLCI) and operational block 706 supplies the received frame to depacketizer 208 (FIG. 2). Thereafter, the sequence is exited via step 707. Returning to step 702, if the test result is NO, conditional branch point 708 tests to determine if there is a generated frame from packetizer 204 (FIG. 2). If the test result in step 708 is NO, the sequence is exited via step 707. If the test result in step 708 is YES, operational block 709 determines the virtual link ID (DLCI) for the generated frame. Then, conditional branch point 710 tests to determine if the remap control signal is active for this virtual link ID (DLCI). If the test result in 710 is YES, operational block 711 changes the virtual link ID (DLCI) in the generated frame to the alternate virtual link ID (DLCI) for the appropriate virtual link in the alternate virtual circuit (FIG. 1). Then, operational block 712 supplies as an output the generated frame to transmit frame bus 209 (FIG. 2). Thereafter, the sequence is exited via step 707. Returning to step 710, if the test result is NO, the generated frame DLCI is not changed and steps 712 and 707 are iterated.

FIG. 8 is a flow chart of a sequence of operations effected in frame relay unit 214 of FIG. 2. This flow chart does not completely describe the LAPD frame relay function known to the art but only those functions necessary to this embodiment of the invention. Accordingly, the sequence is entered via step 801. Then, conditional branch point 802 tests to determine if there is a received frame on receive frame bus 206 (FIG. 2). If the test result in step 802 is NO, conditional branch point 803 tests to determine if there is a receive fault indication message on receive frame bus 206 (FIG. 2). If the result in step 803 is NO, the sequence is exited via step 804. If the test result in either step 802 or step 803 is YES, operational block 805 determines the virtual link ID (DLCI) for the received frame. Operational block 806 determines the virtual link ID (DLCI) for the connected virtual link, i.e., the frame relay connection. Operational block 807 changes the virtual link ID (DLCI) of the received frame to the virtual link ID (DLCI) for the connected virtual link. Operational block 808 supplies as an output the modified "received" frame to the transmit frame bus 209 (FIG. 2). Thereafter, the sequence is exited by step 804.

Although this embodiment of the invention has been described in terms of so-called provisioned virtual circuits and frame-relay, it will be apparent to those skilled in the art that the invention is equally applicable to switched virtual circuits and to frame switching arrangements.

Claims:

1. Apparatus in a packet node for recovering from faults in transmission paths including at least one virtual circuit in a network including a plurality of packet nodes, the apparatus comprising:
    means for detecting faults in at least one transmission path associated with the node;
    first means for determining if any virtual circuit affected by a detected fault is terminated in the node;
    means for generating a fault indication message for each virtual circuit affected by the detected fault that is not terminated in the node;
    first means for transmitting each of said generated fault indication messages on their associated virtual circuits away from the fault to some other node in the network; and
    means for switching any affected virtual circuits determined to be terminated in the node to associated alternate virtual circuits for transmission toward a destination node.

2. The apparatus as defined in claim 1 further including
    means for receiving fault indication messages including second means for determining if a virtual circuit identified in a received fault indication message is terminated in the node, and
    second means for transmitting any of said received fault indication messages not associated with a virtual circuit terminated at the node on their associated virtual circuits to some other node in the network.

3. The apparatus as defined in claim 2 wherein each of said virtual circuits comprises a first access circuit at an originating node, a second access circuit at a destination node and at least one virtual link.

4. The apparatus as defined in claim 3 wherein said received fault indication message includes an identity of a virtual link in the virtual circuit that it is being transmitted on, said second means for determining includes means for generating a control signal representative of whether said virtual link identified in the received fault indication message is mapped to an access circuit in the node and said means for switching is responsive to said control signal for changing the identity of said virtual link to an alternate virtual link identity when said control signal indicates that said virtual link is mapped to an access circuit in the node, wherein said access circuit is mapped to an alternate virtual circuit for transmission to said access circuit in said destination node.

5. The apparatus as defined in claim 3 wherein said first means for determining includes means for identifying access circuits in the node that are affected by the detected fault, means for identifying an associated virtual link for each access circuit in the node which is affected by the detected fault and means for generating a first control signal representative that a corresponding access circuit is mapped to a virtual link that is affected by the detected fault, and wherein said means for switching includes means responsive to said first control signal for changing the identity of said virtual link associated with the identified access circuit to an alternate virtual link identity, wherein said access circuit is mapped to an alternate virtual circuit.

6. The apparatus as defined in claim 3 wherein said virtual circuit may include a virtual link being mapped to another virtual link in a node, and wherein said means for generating a fault indication message includes means for identifying a virtual link to which a virtual link affected by the detected fault is mapped to and means for including the identity of the identified virtual link as an address for the fault indication message being generated for the affected virtual circuit, and wherein said first means for transmitting supplies said generated fault indication message as an output on said affected virtual circuit.

7. The apparatus as defined in claim 3 wherein said second means for transmitting includes means for determining an identity of a virtual link in said received fault indication message, means for determining an identity of an associated virtual link to which said identified virtual link is to be connected to, means for changing the virtual link identification in the fault indication message to that of the associated virtual link and means for supplying the fault indication message including the associated virtual link identity as an output on said affected virtual circuit.

8. The apparatus as defined in claim 3 wherein said fault indication message comprises a frame including a plurality of fields, a predetermined field including an identity of a virtual link of a virtual circuit affected by the detected fault and a field including an indication of whether a fault condition exists.

9. The apparatus as defined in claim 8 wherein a field in said frame includes an indication representative that the frame is a fault indication message.

10. The apparatus as defined in claim 9 wherein said frame is a LAPD XID frame having a field including an indication that the frame is an XID frame.

11. A packet network including a plurality of packet nodes, each of the packet nodes including apparatus for recovering from faults in transmission paths including at least one virtual circuit associated with the node, the apparatus comprising:
    means for detecting faults in at least one transmission path associated with the node;
    first means for determining if any virtual circuit affected by a detected fault is terminated in the node;
    means for generating a fault indication message for each virtual circuit affected by the detected fault that is not terminated in the node;
    first means for transmitting each of said generated fault indication messages on their associated virtual circuits away from the fault to some other node in the network; and
    means for switching any affected virtual circuits determined to be terminated in the node to associated alternate virtual circuits for transmission toward a destination node.

12. The apparatus as defined in claim 11 further including means for receiving fault indication messages including second means for determining if a virtual circuit identified in a received fault indication message is terminated at the node, and second means for transmitting any of said received fault indication messages not associated with a virtual circuit terminated at the node on their associated virtual circuits to some other node in the network.

13. The apparatus as defined in claim 12 wherein each of said virtual circuits comprises a first access circuit at an originating node, a second access circuit at a destination node and at least one virtual link.

14. The apparatus as defined in claim 13 wherein said received fault indication message includes an identity of a virtual link in the virtual circuit that it is being transmitted on, said second means for determining includes means for generating a control signal representative of whether said virtual link identified in the received fault indication message is mapped to an access circuit in the node and said means for switching is responsive to said control signal for changing the identity of said virtual link to an alternate virtual link identity when said control signal indicates that said virtual link is mapped to an access circuit in the node, wherein said access circuit is mapped to an alternate virtual circuit for transmission to said access circuit in said destination node.

15. The apparatus as defined in claim 13 wherein said first means for determining includes means for identifying access circuits in the node that are affected by the detected fault, means for identifying an associated virtual link for each access circuit in the node which is affected by the detected fault and means for generating a first control signal representative that a corresponding access circuit is mapped to a virtual link that is affected by the detected fault, and wherein said means for switching includes means responsive to said first control signal for changing the identity of said virtual link associated with the identified access circuit to an alternate virtual link identity, wherein said access circuit is mapped to an alternate virtual circuit.

16. The apparatus as defined in claim 13 wherein said virtual circuit may include a virtual link being mapped to another virtual link in a node, and wherein said means for generating a fault indication message includes means for identifying a virtual link to which a virtual link affected by the detected fault is mapped to and means for including the identity of the identified virtual link as an address for the fault indication message being generated for the affected virtual circuit, and wherein said first means for transmitting supplies said generated fault indication message as an output on said affected virtual circuit.

17. The apparatus as defined in claim 13 wherein said second means for transmitting includes means for determining an identity of a virtual link in said received fault indication message, means for determining an identity of an associated virtual link to which said identified virtual link is to be connected to, means for changing the virtual link identification in the fault indication message to that of the associated virtual link and means for supplying the fault indication message including the associated virtual link identity as an output on said affected virtual circuit.

18. The apparatus as defined in claim 13 wherein said fault indication message comprises a frame including a plurality of fields, a predetermined field including an identity of a virtual link of a virtual circuit affected by the detected fault and a field including an indication of whether a fault condition exists.

19. The apparatus as defined in claim 18 wherein a field in said frame includes an indication representative that the frame is a fault indication message.

20. The apparatus as defined in claim 19 wherein said frame is a LAPD XID frame having a field including an indication that the frame is an XID frame.

21. A method for recovering from faults in transmission paths including at least one virtual circuit associated with a packet node in a network including a plurality of packet nodes, the method comprising the steps of:

detecting faults in at least one transmission path associated with the node;

determining if any virtual circuit affected by a detected fault is terminated in the node;

generating a fault indication message for each virtual circuit affected by the detected fault that is not terminated in the node;

transmitting each of said generated fault indication messages on their associated virtual circuits away from the fault to some other node in the network; and switching any affected virtual circuits determined to be terminated in the node to associated alternate virtual circuits for transmission toward a destination node.

22. The method as defined in claim 21 further including the steps of receiving fault indication messages including the step of determining if a virtual circuit identified in a received fault indication message is terminated in the node, and transmitting any of said received fault indication messages not associated with a virtual circuit terminated at the node on their associated virtual circuits to some other node in the network.

23. The method as defined in claim 22 wherein each of said virtual circuits comprises a first access circuit at an originating node, a second access circuit at a destination node and at least one virtual link.

24. The method as defined in claim 23 wherein said fault indication message comprises a frame including a plurality of fields, a predetermined field including an identity of a virtual link of a virtual circuit affected by the detected fault and a field including an indication of whether a fault condition exists.

25. The method as defined in claim 24 wherein a field in said frame includes an indication representative that the frame is a fault indication message.

26. The method as defined in claim 25 wherein said frame is a LAPD XID frame having a field including an indication that the frame is an XID frame.

* * * * *